United States Patent Office 2,789,973
Patented Apr. 23, 1957

2,789,973

SYNTHETIC OPTICALLY-ACTIVE HOMOPOLY-AMIDES OF ALPHA - MONAMINOMONCAR-BOXYLIC ACIDS

Robert N. MacDonald, Wilmington, Del., assignor to E. I. du Pont de Nemours and Company, Wilmington, Del., a corporation of Delaware No Drawing. Application December 28, 1950, Serial No. 203,213

5 Claims. (Cl. 260—78)

This invention relates to synthetic polyamides and more specifically to new and unusual alpha-amino acid polymers.

This application is a continuation-in-part of my application Serial No. 108,237, filed August 2, 1949, now abandoned.

It has been disclosed by Woodward and Schramm, J. Am. Chem. Soc., 69, June 1947, 1550–1551, that a film-forming copolyamide can be prepared by copolymerizing the N-carboanhydrides of L-leucine and DL-phenylalanine. Similarly, in the application of MacDonald, Ser. No. 766,457, filed August 5, 1947, now U. S. Patent 2,572,844, it is disclosed that soluble, film- and fiber-forming, high molecular weight alpha-amino acid copolyamides can be prepared through the copolymerization of the N-carboanhydrides of selected alpha-amino acids. However, these copolyamides are not as sufficiently stable hydrolytically nor resistant enough to organic solvents as is desired.

More recently in the application of Cleaver and Schreiber, filed January 19, 1949, Ser. No. 71,756, now abandoned, it is disclosed for the first time that a high molecular weight, soluble, film- and fiber-forming alpha-amino acid homopolyamide of considerable strength and toughness can be prepared by polymerizing the N-carboanhydride of synthetic, optically-inactive, alpha-aminoisocaproic acid. However, yarn from this polymer is still not strong enough to fulfill all desirable fabric applications.

This invention has as an object the preparation of alpha-aminoacid polyamides of greater strength in film and/or fiber form. A further object is the preparation of hydrolytically more stable and more organic solvent resistant alpha-amino acid homopolyamides. Another object is the preparation of such homopolyamides of greater stiffness. Other objects will appear hereinafter.

These objects are accomplished by the invention of high molecular weight, synthetic, optically-active homopolyamides from alpha-monoaminomonocarboxylic acids, having their center of asymmetry in the alpha-carbon atom, and other than the amino and carboxyl groups being solely hydrocarbon in nature, which are orientable, i. e., cold-drawable to the extent of at least 100% and of intrinsic viscosity, at 25° C. in a polar solvent, greater than 0.6, and preferably greater than 0.8, and exceptionally strong and tough, especially in film or fiber form. These extremely high molecular weight, synthetic, optically-active, alpha-amino acid homopolyamides are easily shaped by normally used film-casting and wet- and dry-spinning techniques into films and fibers that surprisingly are hydrolytically more stable, more organic solvent resistant, stiffer, and as much as 100% stronger than other alpha-amino acid polyamides and copolyamides, even including the previously outstanding synthetic, optically-inactive polymeric alpha-aminoisocaproic acid.

The synthetic, optically-active alpha-amino acid homopolyamides of this invention may be prepared from the amide-forming derivatives of the corresponding acids, for instance, the carbon dioxide adducts, and the N-carboanhydrides. Of these amide-forming derivatives, the N-carboanhydrides are preferred since they can be easily prepared in good yields and high degrees of purity and are capable of ready polymerization to give the high molecular weight polymers of this invention. Thus, these polymers are preferably prepared by the condensation polymerization (thermal and/or initiated by added small quantities of initiators) with carbon dioxide evolution of the corresponding N-carboanhydrides in halogenated hydrocarbon and aromatic hydrocarbon solvents.

The following examples in which the parts given are by weight are submitted to further illustrate this invention. The term "inherent viscosity" ($\eta_{inh.}$) used herein is defined by the following equation:

$$\eta_{inh.} = \frac{ln\,\eta_{rel.}}{C}$$

wherein $ln$ is the natural logarithm, $$\eta_{rel.} = \frac{\eta\text{ solution}}{\eta\text{ solvent}}$$

C is concentration in grams per 100 cc. of solution, $\eta$ representing viscosity. Intrinsic viscosity ($[\eta]$) is defined by the following equation:

$$[\eta] = \lim_{C \to 0} \frac{ln\,\eta_{rel.}}{C}$$

wherein $ln$, $\eta_{rel.}$ and C are as defined above. All viscosity results recorded in the following examples are obtained on solutions of the various polymers at the indicated concentrations in dichloroacetic acid at 25° C. unless otherwise specified. The term "N. E." stands for neutral equivalent.

EXAMPLE I

A. Preparation of L-alanine N-carboanhydride

L-alanine is prepared from DL-alanine my the methods of Fodor, Price and Greenstein, J. Biol. Chem., 178, 503 (1949) and Price, Gilbert and Greenstein, ibid., 179, 1169 (1949) involving the incubation of N-acetyl-DL-alanine with an extract prepared from hog kidney cortex and the resulting enzymatic hydrolysis of the N-acyl-L-amino acid. Representative samples of L-alanine so prepared exhibits a neutral equivalent of 89.3 (theory 89.1) and a specific rotation $[\alpha]_D^{25}$ of $+14.3°$ as measured in 1 N hydrochloric acid solution at a concentration of 6.4% (weight/volume).

A suspension of 50 parts of L-alanine thus prepared in about 1000 parts of purified anhydrous dioxane is prepared in a glass reactor, open to the atmosphere through drying tubes and equipped with a reflux water condenser, a stirrer and an inlet tube connected to a source of gaseous phosgene and so arranged that its lower extremity is just above the surface of the liquid. The suspension is heated to 45–52° C. with vigorous stirring and an excess of gaseous phosgene passed into the reaction mixture over a period of two hours while maintaining the temperature in this range. The reaction mixture is filtered hot to remove the last small traces of undissolved solid. The dioxane solvent is then removed from the filtrate by distillation under reduced pressure at temperatures not exceeding 45° C. until the filtrate is reduced to about 20% of its initial volume. The pale yellow oil thus obtained is washed with about 225 parts of petroleum ether. The slightly colored solid product thus obtained is dissolved at room temperature in about 100 parts of purified anhydrous dioxane. The resulting solution is diluted with about 250 parts of absolute diethyl ether. The resulting diluted solution is treated with decolorizing charcoal, filtered, and a total of about 760 parts of petroleum ether (boiling range 30–60° C.) added to the filtrate, which is then cooled in an ice-water bath.

The white crystalline product thus obtained is removed by filtration. There is thus obtained 62 parts (96% of theory) of white, nicely crystalline L-alanine N-carboanhydride. A further recrystallization, using approximately 150 parts of dioxane, 350 parts of absolute diethyl ether and sufficient petroleum ether to just bring the solution to the cloud point, yields 42 parts of white, crystalline L-alanine N-carboanhydride melting at 86° C. with decomposition. After another similar recrystallization, the L-alanine N-carboanhydride exhibits a melting point of 87° C. with decomposition.

*Analysis.*—Calculated for $C_4H_5NO_3$: C, 41.70%; H, 4.35%; N, 12.20%. Found: C, 41.93%; H, 4.70%; N, 12.64%.

Samples of L-alanine N-carboanhydride similarly prepared exhibit a specific rotation $[\alpha]_D^{25} = -2.70°$, as measured in solution in purified anhydrous dioxane at a concentration of 6.4 (weight/volume). It is interesting to note that the direction of optical rotation of the L-alanine N-carboanhydride is opposite to that of the parent L-alanine.

B. *Polymerization of L-alanine N-carboanhydride*

A suspension of 31 parts of L-alanine N-carboanhydride (prepared in general as described previously in Example I, part A and thrice recrystallized with absolute diethyl ether/petroleum ether mixtures) in about 1800 parts of reagent grade benzene is heated gently (to about 40° C.) with stirring and then filtered to remove the approximately 5 to 6 parts of undissolved N-carboanhydride and/or low molecular weight polymer. The filtrate is then heated to the reflux and about 45 parts of benzene removed by distillation to remove any residual traces, e. g., surface films, of water in the polymerization reactor. The solution is maintained at the reflux for seven days under anhydrous conditions during which time the poly-L-alanine precipitates out of solution as formed. At the end of this time, the polymer is removed by filtration and the portion of the polymer which adheres to the walls of the polymerization reactor is removed by dissolving in dichloroacetic acid and recovered from solution by film casting—the films being precipitated with water and the dichloroacetic acid solvent removed by leaching with 2-B alcohol. The poly-L-alanine thus obtained exhibits $\eta_{inh.}$ of 3.82 and 3.84 at concentrations, respectively, of 0.1 and 0.3 gram per 100 cc. of solution.

Other samples of poly-L-alanine similarly prepared varying the polymerization cycle from 24 hours to ten days and the N-carboanhydride/polymerization solvent ratio (weight/volume) from 3/400 to 28/3000 yield poly-L-alanines of $[\eta]$ ranging from 1.5 to 4.4. A representative sample of such poly-L-alanines exhibits a specific rotation $[\alpha]_D^{25} = +39 \pm 2.5°$ in dichloroacetic acid solution at a concentration of about 1% (weight/volume). This direction of rotation is the same as that of the parent L-alanine and opposite to that of the L-alanine N-carboanhydride. Film samples of representative poly-L-alanines have proven to be tough, strong, cold drawable and to exhibit rather high moisture absorption and receptivity to representative acid, acetate, direct, and vat dyes. Light scattering studies of the poly-L-alanine indicate a particle weight of several hundred thousands. However, the extent of the association is not known. Representative poly-L-alanines are soluble in dichloroacetic acid and sulfuric acid at room temperature, but insoluble in formic acid, m-cresol, and aqueous phenol, even when heated on a steam bath.

A sample of a representative poly-L-alanine upon hydrolysis for 29 hours at the reflux in 6 N hydrochloric acid solution is hydrolyzed to the extent of about 30%. The unhydrolyzed portion is removed by filtration and the clear filtrate evaporated to dryness under reduced pressure. The solid thereby obtained is taken up in water and the solution again evaporated to dryness—this procedure being repeated several times to insure complete removal of hydrochloric acid. The clear, white solid finally obtained, i. e., L-alanine hydrochloride, is taken up in water, the pH of the solution adjusted to neutrality by the addition of lithium hydroxide, and excess ethyl alcohol added. Pure white crystalline L-alanine separates from the solution and is removed by filtration and carefully washed and dried. A sample of this L-alanine exhibits a specific rotation $[\alpha]_D^{25} = +14.2°$ as measured in 1 N hydrochloric acid solution at a concentration of 6.0% (weight/volume). This result agrees very well with the $+14.3°$ given in Example I, part A for the starting L-alanine. These data clearly demonstrate that little, if any, racemization occurs in the preparation of the poly-L-alanine outlined in the various steps given in Example I, parts A and B.

C. *Spinning of poly-L-alanine*

A spinning solution is prepared by dissolving a total of 50 parts of various poly-L-alanines (prepared in general as described previously in Example I, part B) in 936 parts of dichloroacetic acid and 10 parts of water and the solution is filtered. A film sample of the filtered solution, prepared by film casting, exhibits an $\eta_{inh.} = 1.59$ at a concentration of 0.1 gram per 100 cc. of solution. The filtered solution is then pressure spun through a 30 hole stainless steel spinneret (hole diameter 0.005 inch) at the rate of 1.7 cc. of spinning solution per minute into a water coagulating bath at 58° C. using a 104 inch yarn bath travel and two vertical rollers. The yarn is stretched 2.6:1 between the Godet wheel and the windup bobbin. The yarn is washed on the bobbin overnight, unwound while wet through a standard fiber finish, dried in air on the bobbin, and then heated taut for five minutes at 275° C. This yarn exhibits dry tenacities of as high as 3 grams per denier, elongations of 6%, a denier of about 90, a shrinkage of less than 1% in boiling water, and a sticking point in excess of 400° C. The yarn exhibits a round cross section and a high degree of lateral order.

Other yarn samples are prepared during the same spinning with draw ratios between the Godet wheel and windup bobbins ranging as low as 1.15:1. Yarns with these lower draw ratios are given a second draw through air or ethyl alcohol. Under these conditions, a yarn stretched 1.15:1 during the spinning, followed, after washing and drying, by a draw of 2.0:1 through air, exhibits a tenacity of 2.6 grams per denier, an elongation of 8%, a denier of about 130, and a shrinkage of 0.7% in boiling water. A yarn similarly prepared, substituting a second draw of 2.0:1 through ethyl alcohol for the second air draw, exhibits a dry tenacity of 2.4 grams per denier, and 11% elongation, and a denier of about 128.

The strongest yarns are generally obtained when the yarn is given its maximum stretch between the Godet wheel and windup bobbin rather than in two or more stages. For instance, when a poly-L-alanine of inherent viscosity somewhat lower than those previously discussed is spun as described above into a water coagulating bath at 50–60° C. with the yarn being stretched 2.88:1 between the Godet wheel and the windup bobbin, the yarn, after being washed and dried taut, exhibits a dry tenacity of 3.5 grams per denier, an elongation of 6%, and a denier of 78. Yarns similarly prepared during the same spinning with initial draw ratios varying between 2.62 and 2.78:1 exhibit dry tenacities ranging from 2.9 to 3.4 grams per denier, elongations of from 6 to 7%, and deniers of from 65 to 81. Such lower draw yarn samples can be somewhat improved by heating taut for five minutes at 275° C. Specifically a sample prepared with an initial draw of 2.78:1 and washed, dried and heated taut for five minutes at 275° C., exhibits a dry tenacity of 3.5 grams per denier, an elongation of 4%, and a denier of 75.

Representative samples of such yarns exhibit water absorptions at 25° C. of 5% at 60% relative humidity (R. H.), 6.2% at 65% R. H., and 56.0% at saturation. High grade textile wool (wool 64's) exhibits a water absorption value of 60–70% at saturation by the same centrifuge method. These polyalanine fibers also exhibit a high degree of orientation as shown by X-ray examination, rather limited organic solubility, and, as mentioned previously, an extremely low shrinkage in water. Accordingly, it is not surprising that such fibers exhibit rather high densities. Specifically, poly-L-alanine fibers of 2.7:1 draw ratio exhibit a density at 25° C. of 1.288–1.293. Tests with receptive dyes indicate these poly-L-alanine yarns to exhibit generally good receptivity to acetate dyes and fair receptivity to acid, direct, and vat dyes.

EXAMPLE II

A. *Preparation of D-alanine N-carboanhydride*

D-alanine is prepared as described previously for L-alanine in the manner of Greenstein, et al.—the D-alanine being obtained subsequent to the isolation of the L-alanine by hydrolysis of the remaining N-acetyl-D-alanine by chemical hydrolysis. The D-alanine so obtained exhibits a specific rotation $[\alpha]_D^{25} = -14.2°$ in 1 N hydrochloric acid solution at a concentration of 6.4% (weight/volume).

A suspension of 45 parts of D-alanine, thus prepared in about 1000 parts of purified anhydrous dioxane, is prepared in a glass reactor, open to the atmosphere through drying tubes and equipped with a reflux water condenser, a stirrer and an inlet tube connected to a source of gaseous phosgene and so arranged that its lower extremity is just above the surface of the liquid. The suspension is heated to 45–52° C. with vigorous stirring and an excess of gaseous phosgene passed into the reaction mixture over a period of two hours and ten minutes while maintaining the temperature in this range. The reaction mixture is filtered while hot to remove the last small traces of undissolved solid. The dioxane solvent is then removed from the filtrate by distillation under reduced pressure at temperatures no higher than 52° C. until the filtrate is reduced to approximately 25% of its original volume. The golden yellow oil thus obtained is taken up in about 350 parts of absolute diethyl ether, the resulting solution treated with decolorizing charcoal for about 15 minutes at room temperature, and the solution finally filtered. Petroleum ether (about 900 parts) is added to the filtrate, and the white crystalline solid thereby formed is removed by filtration and dried. There is thus obtained 32 parts of white, crystalline D-alanine N-carboanhydride. This crystalline material is dissolved in about 100 parts of purified anhydrous dioxane, and the resulting solution diluted with about 350 parts of absolute diethyl ether. Decolorizing charcoal is added, the solution allowed to stand at room temperature for about 30 minutes, and then finally filtered. Petroleum ether (about 900 parts) is added to the clear filtrate, and the resulting mixture cooled in an ice-water bath. The white solid, which crystallizes out, is removed by filtration. After drying, there is thus obtained 30 parts of D-alanine N-carboanhydride as white needles melting at 86–87° C. with decomposition and exhibiting a specific rotation $[\alpha]_D^{25}$ of +3.6° in solution in purified dioxane at 6.1% (weight/volume) concentration.

B. *Polymerization of D-alanine N-carboanhydride*

A solution of 28 parts of purified D-alanine N-carboanhydride, prepared as described above in Example II, part A, in about 2650 parts of reagent grade benzene is heated at the reflux under anhydrous conditions for 166.5 hours during which time the poly-D-alanine precipitates from solution. The above polymer is removed from the polymerization solution by filtration. The polymer, which adheres to the polymerization flask, is dissolved in dichloroacetic acid and recovered by film casting into water—the dichloroacetic acid solvent being leached out with 2–B alcohol at room temperature. The films, after being dried in a vacuum oven at 80–85° C. to constant weight, exhibit a sticking point of 290° C. and are cold-drawable, particulaly when plasticized with alcohol. Samples of these films exhibit inherent viscosities of 3.85 and 3.40 at concentrations, respectively, of 0.1 and 0.3 gram per 100 cc. of solution. The whole polymer, i. e., both above-described portions—the great majority being that removed by filtration, is found to exhibit an $[\eta]$ of 4.07. Another poly-D-alanine (similarly prepared and of $\eta_{inh.} = 1.71$ at a concentration of 0.3 g./100 cc. of solution) exhibits a specific rotation $[\alpha]_D^{26} = -31.4°$ in dichloroacetic acid at 1% (weight/volume) concentration.

Representative film samples as cast in the manner described above have exhibited tenacities ranging from about 5350 to 5850 lbs./sq. in. and elongations of 4 to 5% at thicknesses of 9 to 10 mils. Other samples of these same films after drawing to the extent of 100 to 150% while softened in 2–B alcohol have exhibited tenacities of 12,000–19,000 lbs./sq. in. and elongations of 17% and 11% respectively.

C. *Spinning of poly-D-alanine*

A solution of 10 parts of the poly-D-alanine, described in detail in Example II, part B, in about 230 parts of dichloroacetic acid is spun in the same general manner as described in Example I, part C into a 25° C. water bath containing 0.02% of a commercial octadecyltrimethylammonium bromide with a yarn travel of 43 inches in the coagulating bath with a stretch ratio varying between 2.0 and 2.4:1 between the Godet wheel and the windup bobbin. The yarn thus obtained, after being washed on the bobbin overnight, unwound while wet through a standard yarn finish, dried in air on the bobbin, twisted, and finally boiled off in skein form, exhibits dry tenacities (incline plane) of 1.7 and 2.2 grams per denier and elongations of 17 and 8% at deniers of about 140 and 117 for the 30 filament yarn. Representative samples of such yarns exhibit a shrinkage in boiling water of about 0.8% and a sticking point of above 400° C. with some indication of browning at 375° C.

EXAMPLE III

A. *Preparation of L-alpha-amino-n-butyric acid N-carboanhydride*

A suspension of 20 parts of L-alpha-amino-n-butyric acid, prepared by the methods of Greenstein, et al, supra, in about 500 parts of purified anhydrous dioxane is prepared in a reactor similar to that described previously in Example I, part A. The suspension is heated to 50–60° C. with stirring and excess gaseous phosgene is passed into the reaction mixture for a period of 40 minutes while maintaining the temperature in this range. The resulting, clear, colorless reaction mixture is concentrated by distillation under reduced pressure until a small volume of golden yellow oil is obtained. Upon washing this oil with petroleum ether, a white solid is obtained. This solid is dissolved in about 225 parts of absolute diethyl ether and the resulting solution is boiled briefly with decolorizing charcoal and then filtered. Petroleum ether is added to the clear, colorless filtrate until the cloud point is reached. The cloudy solution is cooled in an ice-water bath and the resulting, almost solid crystalline slurry further diluted with excess petroleum ether. The white crystalline product is removed by filtration and dried. There is thus obtained 18.5 parts (74% of theory) of L-alpha-amino-n-butyric acid N-carboanhydride as white crystals melting at 64–66° C.

*Analysis.*—Calculated for $C_5H_7NO_3$: C, 46.50%; H, 5.42%; N, 10.80%. Found: C, 46.60%; H, 5.58%; N, 10.67%.

B. *Polymerization of L-alpha-amino-n-butyric acid N-carboanhydride*

A solution of 46 parts of twice recrystallized L-alpha-amino-n-butyric acid N-carboanhydride (prepared as described above in Example III, part A) in about 3000 parts of reagent grade benzene is filtered to remove traces of undissolved material and then heated under anhydrous conditions in a carefully ether-rinsed polymerization reactor. About 250 parts of the benzene is removed by distillation during which process presumably any adsorbed water on the internal surface of the reactor is removed. The polymerization solution is then heated at the reflux under anhydrous conditions for about 180 hours. During this time white solid polymer separates out from the polymerization solution. This polymer is removed from the solution by filtration. There is thus obtained about eight parts of poly-L-alpha-amino-n-butyric acid. The bulk of the polymeric product adheres firmly to the walls of the polymerization reactor. This material is dissolved in dichloroacetic acid from which solution it is recovered by precipitation with water. Adsorbed dichloroacetic acid solvent is removed by leaching with alcohol and subsequently dried. A total of 28 parts of poly-L-alpha-amino-n-butyric acid is finally obtained. This product exhibits $\eta_{inh.} = 1.36$ and 1.42 at concentrations, respectively, of 0.1 gram and 0.3 gram per 100 cc. of solution.

C. *Spinning of poly-L-alpha-amino-n-butyric acid*

A solution of 20 parts of the above poly-L-alpha-amino-n-butyric acid in about 280 parts of dichloroacetic acid is spun in the general manner described in detail previously in Example I, part A, using a feed rate of 2.8 cc. of spinning solution per minute, a water coagulating bath at 60° C. containing 0.003% of a commercial octadecyltrimethylammonium bromide, a 30 hole stainless steel spinneret with 0.003 inch hole diameter and a 35 inch bath travel. The yarn is stretched 3.3:1 in air during spinning between the Godet wheel and the windup bobbin. The yarn thus obtained, after washing and drying, exhibits a denier of 101.7, a dry tenacity of 1.5 grams, an elongation of 17%, a shrinkage of 2.0% on boil off, and a sticking point in excess of 400° C.

Yarn similarly prepared, varying only in that the feed rate is 1.7 cc./min. and the draw ratio between the Godet wheel and the windup bobbin is 3.0:1, exhibits a denier of 103.0, a dry tenacity of 1.6 grams per denier, an elongation of 11%, and a shrinkage of 1.6% on boil off. Yarn similarly prepared to the above varying only in that the draw ratio between the Godet wheel and the windup bobbin is 2.0:1 and the thus formed yarn is further drawn 1.5:1 through boiling water subsequent to washing and drying exhibits essentially the same properties.

EXAMPLE IV

A solution of 7.5 parts of poly-D-alanine (prepared as described previously in Example II, part B and of $\eta_{inh.} = 1.58$ at a concentration of 0.1 g./100 cc. of solution) in about 120 parts of dichloroacetic acid and a solution of 7.5 parts of poly-L-alanine (prepared as described previously in Example I, part B and of $\eta_{inh.} = 3.06$ at a concentration of 0.1 g./100 cc. of solution) in about 120 parts of dichloroacetic acid are mixed thoroughly at room temperature and diluted with stirring with about 40 additional parts of dichloroacetic acid. The resulting solution is spun as described previously in Examples I, II, III, parts C, into a water coagulating bath at 50° C. containing 0.1% of a commercial octadecyl trimethyl ammonium bromide with the yarn being drawn 2.2 to 2.3:1 between the Godet wheel and the windup bobbin through air. The yarn thus obtained is washed and dried and boiled off in skein form. This yarn exhibits a dry tenacity of 2.0 grams per denier, an elongation of 7%, a shrinkage during boil off of 1%, and a sticking point of over 400° C. Yarns similarly prepared, except that the draw is carried out through hot water, exhibit essentially the same properties.

EXAMPLE V

A. *Preparation of L-leucine N-carboanhydride*

A suspension of 70 parts of L-leucine [purified by way of its naphthalene-beta-sulfonate according to the method given by Niemann, J. Biol. Chem. 171, 241 (1948)] in 720 parts of purified anhydrous dioxane in a reactor similar to that described in Example I is heated to 50° C. with vigorous stirring and a stream of gaseous phosgene is passed into the reaction mixture over a period of 54 minutes at such a rate as to keep the dioxane saturated with phosgene while maintaining the temperature at 50° C. At the end of this time most of the solid has dissolved. The small quantity of insoluble material is removed by filtration, and the dioxane solvent is removed from the filtrate by passage through a stripping still at 50° C. under 65 mm. of mercury pressure. The oily, yellow residue thus obtained crystallizes upon washing with petroleum ether. The solid product is recrystallized from an ether/petroleum ether mixture. There is thus obtained 70 parts (84% of the theoretical yield) of the N-carboanhydride of L-leucine. This material is further recrystallized three times from ether/petroleum ether mixtures. There is finally obtained 33 parts of highly purified L-leucine N-carboanhydride as colorless crystals melting sharply at 76° C.

B. *Polymerization of L-leucine N-carboanhydride*

A solution of 32.9 parts of the above highly purified L-leucine N-carboanhydride in 638 parts of reagent benzene in a reactor open to the atmosphere through a small capillary tube is heated at 65° C. After 48 hours the solution has set to a gel. Heating is continued at 65° C. for an additional eight days. A sample of the poly-L-leucine isolated from the polymerization mixture exhibits an intrinsic viscosity in sulfuric acid of 1.19. The polymerization mixture is then diluted with 638 parts of benzene and the resulting viscous solution poured in a thin film onto a glass plate and the benzene allowed to evaporate at room temperature. After removal from the casting surface, there is obtained a clear, tough, strong film of poly-L-leucine, i. e., the polyamide from L-leucine, exhibiting a tensile strength of 7800–8000 lbs./sq. in. and an elongation of 40–50% on the Olsen tensile tester. This poly-L-leucine is insoluble in chloroform, m-cresol, methylene chloride, phenol, tetrachloroethane, xylene, and dichloroacetic acid.

Similar films prepared in a like manner from purified DL-leucine N-carboanhydride, i. e., films of the polyamide from DL-leucine have exhibited tensile strengths of 6000–7000 lbs./sq. in. and elongations of 25–30%. This poly-DL-leucine is soluble in chloroform, m-cresol, methylene chloride, phenol, tetrachloroethane, xylene, and dichloroacetic acid. Further, the intrinsic viscosity of another similar sample of poly-L-leucine in concentrated sulfuric acid decreased from 1.23 to 0.90 (73% of its initial value) after 17 hours at room temperature in this solvent; whereas, a similar sample of poly-DL-leucine with an intrinsic viscosity of 1.54 in m-cresol exhibited an initial intrinsic viscosity in concentrated sulfuric acid of 2.13 which decreased to 1.16 (54% of its initial value) after 17 hours at room temperature in this solvent. These results show that poly-L-leucine possesses a greater degree of strength in film form, a higher degree of hydrolytic stability, and better organic solvent resistance than does poly-DL-leucine.

C. *Spinning of poly-L-leucine*

Eleven and twenty-seven hundredths (11.27) parts of poly-L-leucine (of intrinsic viscosity 1.19 in concentrated sulfuric acid, see part B) is dissolved in a mixture of 450 parts of benzene, 84 parts chloral and 20 parts of formic acid (technical grade, 88–90%). This solution is quite fluid at 30° C., but tends to set up to a gel at lower temperatures. A solution is spun into a methanol coagulating bath through a 30 hole spinneret (hole diameter 0.0065 inch, i. e., 6.5 mils.) at a rate of 8–9 cc. per minute. The yarn so formed is carried for a total distance of 120 inches through the coagulating bath and picked up at a rate of 16.75 feet per minute on a Godet wheel and then wound up on a bobbin at the rate of 30 feet per minute. Due to the difference in the windup and pickup rate, the yarn, therefore, is stretched 1.8:1 in air during the windup process. This yarn is washed, twisted (Z) four turns per inch, dried and boiled-off for 45 minutes in a bath containing 0.1% of the sodium salt of a fatty alcohol sulfate [a commercial wetting agent ("Duponol" WA)]. After again washing and drying, the yarn (33.1 denier) is tested for physical properties at 60% relative humidity and 21° C. The results are as follows:

Dry tenacity, 2.07 grams per denier at 13% elongation
Loop tenacity, 1.79 grams per denier at 10% elongation
Wet tenacity, 1.14 grams per denier at 11% elongation
Modulus, 47 grams per denier per 100% elongation It should be noted that values obtained on similarly prepared samples of poly-DL-leucine are much lower, being respectively: from 0.76/7 to 1.26/19, 0.66/5, 0.75/7, 14–27. (See following table.)

Yarn was similarly prepared from another sample of poly-L-leucine of intrinsic viscosity 0.60 in concentrated sulfuric acid, whose draw ratio, denier and dry tenacity are respectively, 1.72:1, 75.0 and 1.71 grams per denier at 24% elongation.

Further data serving to illustrate the better physical properties, particularly the strength, of the fibers prepared from the optically-active alpha-amino acid homopolyamides of this invention in contrast to even the outstanding fibers prepared from optically-inactive, synthetic alpha-amino acid homopolyamides, for example those described in the application of Cleaver and Schreiber Ser. No. 71,756, filed January 19, 1949, now abandoned, are presented in the following table, wherein T/E refers to tenacity and elongation expressed in units of grams per denier (g. p. d.) and percent (%) and modulus is expressed in units of grams per denier per 100% elongation (g. p. d./100%):

and the extract washed twice and extracted with a total of 42 parts of sodium bicarbonate in 500 parts of water. The final extract is acidified with concentrated hydrochloric acid and cooled. The resulting mixture is extracted with ether and the extract washed with distilled water until a negative test for chloride ion is obtained. The ether extract is dried over anhydrous sodium sulfate and the ether removed by distillation at 40° C. under 1 mm. of mercury pressure. There is thus obtained 51.3 parts (71% yield) of N-carbomethoxy-L-leucine as a colorless syrup.

B. *Preparation of the N-carboanhydride of L-leucine*

A mixture of 38.8 parts of the above N-carbomethoxy-L-leucine, 81.9 parts of thionyl chloride and 212.4 parts of anhydrous diethyl ether is refluxed under anhydrous conditions for one hour and then let stand at room temperature overnight. The ether solvent and excess thionyl chloride are then removed by distillation under reduced pressure and the residue heated at 65–70° C. for one hour. After cooling the material is taken up in anhydrous diethyl ether, filtered and petroleum ether added to the filtrate slowly with stirring until the cloud point is reached—all operations being carried out under anhydrous conditions. After cooling in an ice/water bath, the crystalline precipitate is removed by filtration and again recrystallized by dissolving in anhydrous diethyl ether and adding petroleum ether to the cloud point. There is finally obtained after recrystallization from benzene and again from an ether/petroleum ether mixture the purified N-carboanhydride of L-leucine as needle crystals melting at 84–85° C.

C. *Preparation of the polyamide from L-leucine*

The above L-leucine N-carboanhydride is dissolved in benzene dried over sodium and therefore containing but an extremely small amount of water and let stand at room temperature in a closed glass reactor. At the end of one day's time, the solution becomes more viscous and after standing for an additional three weeks the solution has become gel-like. A small quantity of benzene is added and the solution heated. There is obtained a clear viscous solution which is flowed in a thin film onto a glass plate and the benzene solvent allowed to evaporate at room temperature. After removal from the casting surface, there is obtained a clear, quite tough film of the polyamide from L-leucine which is insoluble in m-cresol and chloroform. After fractionation by dis-

PHYSICAL PROPERTIES OF YARNS FROM POLYLEUCINES

|  | Poly-DL-Leucine | | | | | Poly-L-Leucine | | | |
| --- | --- | --- | --- | --- | --- | --- | --- | --- | --- |
| ($\eta$) | 1.80 | 0.95 | 0.95 | 1.80 | 1.80 | 0.60–0.63 | 1.17 | 1.17 | 0.63 |
| Draw ratio | 1.81 | 2.56 | 1.95 | 2.56 | 1.95 | 1.72 | 1.89 | 2.10 | 1.81 |
| Denier | 105.2 | 81.0 | 111.0 | 57.0 | 104.0 | 75.0 | 33.1 | 69.4 | 47.0 |
| Dry T/E—g. p. d./percent | 0.76/7 | 1.26/19 | 0.93/24 | 1.22/14 | 0.88/23 | 1.71/24 | 2.07/13 | 1.43/11 | 2.03/16 |
| Loop T/E | 0.66/5 | | | | | 1.56/13 | 1.79/10 | 1.34/8 | |
| Wet T/E | 0.75/7 | | | | | 1.63/22 | 1.41/11 | 1.38/11 | |
| Modulus (g. p. d./100 percent) | 27 | 16 | 13 | 19 | 14 | 41 | 47 | 44 | 55 |
| Sticking Point—° C | 250 | | | | | | | | 260 |

EXAMPLE VI

A. *Preparation of N-carbomethoxy-L-leucine*

To a cooled, filtered solution of 50 parts of L-leucine (analysis: N. E. 132.3, N, 10.71%; calculated for $C_6H_{14}O_2N$: N. E. 131.2, N, 10.68%) dissolved in 190 parts of water containing 15.2 parts of sodium hydroxide are added, slowly, simultaneously, and with stirring over a period of 30 minutes, 36 parts of methyl chloroformate and a solution of 15.2 parts of sodium hydroxide in 94 parts of water. The resulting mixture is kept in an ice bath overnight and then washed four times with a total of 453.6 parts of ether and finally acidified with concentrated hydrochloric acid at −1° C. The white oil thus formed is extracted with ether (about 425 parts)

persing in benzene at room temperature and filtering, the less soluble fraction (which can be dissolved in benzene upon heating) exhibits an intrinsic viscosity of 0.655 in concentrated sulfuric acid at 25° C.

There have been reported in the art other methods for preparing N-carboanhydrides of alpha-amino acids, for example the methods given by Leuchs, Ber. 39, 857 (1906), illustrated in general by Example VI, parts A and B, wherein an alpha-amino acid is reacted with a haloformate ester, specifically a chloroformate ester, the resulting ester of the N-carboxy-alpha-amino acid reacted with thionyl chloride under anhydrous conditions and the N-carboanhydride subsequently isolated, and in the application of Prichard, Ser. No. 778,457, filed October 7, 1947, now Patent No. 2,516,145; wherein an alpha-amino acid is reacted with an alkali metal alkoxide and carbon dioxide and the resulting dialkali metal salt of the alpha-carboxyaminocarboxylic acid reacted with thionyl chloride and the N-carboanhydride subsequently isolated. However, for reasons unknown, the highest molecular weight, orientable, film- and fiber-forming, polymeric, synthetic, optically-active alpha-amino acid homopolyamides exhibiting in the highest degree the previously referred to outstanding physical characteristics, are more readily obtained from the requisite N-carboanhydride as prepared from the direct reaction of phosgene, with or without the use of an ether-type reaction medium, on the necessary alpha-amino acid, or its alkali or alkaline earth metal or hydrohalide salts, as disclosed in the applications of Prichard, Ser. No. 52,971, filed October 4, 1948, now abandoned, as is illustrated by Examples I, part A, and II, part A, and MacDonald, Ser. No. 83,229, filed March 24, 1949, now Patent No. 2,662,084.

For the preparation of the highest molecular weight polymers, it is also necessary that the N-carboanhydrides, however prepared, be in a state of high purity. A ready method of obtaining the N-carboanhydrides in the levels of purity necessary for the preparation of the highest molecular weight, optically-active homopolymers is to recrystallize the N-carboanhydrides by a precipitation-recrystallization technique using temperatures no lower than 0° C. from anhydrous diethyl ether and petroleum ether. For example, in recrystallizing 100 parts of L-leucine N-carboanhydride, it is preferred to dissolve the N-carboanhydride in about 500 parts of anhydrous diethyl ether at room temperature, to remove any undissolved material by filtration under anhydrous conditions, and then to add petroleum ether slowly with stirring to the point of first noticeable and persistent cloudiness (usually this requires about 700 parts of petroleum ether) and subsequently to allow the cloudy solution to stand at room temperature and to remove the purified crystalline N-carboanhydride by filtration under anhydrous conditions. If desired, to quicken the crystallization and/or improve the efficiency of recovery, the petroleum ether/ether solution may be cooled in an ice bath. However, it should be pointed out that if temperatures lower than 0° C. are used in cooling the recrystallization medium, the N-carboanhydride isolated therefrom is frequently not as satisfactory for polymerization since it does not lend itself to the preparation of the highest molecular weight, optically-active, synthetic alpha-amino acid homopolyamides, presumably due to the presence of some as yet unidentified impurities. As would be expected if the recrystallization is carried out at temperatures no lower than room temperature, the recovery of N-carboanhydride is not as efficient as might be desired. It usually is of the order of 70%. However, by cooling the recrystallization solution to 0° C., recoveries as high as 90% are obtained.

In order to obviate the necessity of repeated recrystallizations with their concomitant high loss of N-carboanhydride and in many cases even to insure the preparation of N-carboanhydride of sufficient purity to be polymerizable to the ultra-high molecular weight, optically-active, homopolyamides of this invention, it is desirable that the starting material for conversion to the N-carboanhydride (usually the alpha-amino acid itself) be carefully purified.

Although other means of polymerization for the preparation of the high molecular weight, synthetic, optically-active, alpha-amino acid homopolyamides of this invention can be used for instance, polymerization of the N-carboanhydrides in bulk by thermal means with or without the presence of added polymerization initiators or polymerization in suspension in an organic liquid which is a non-solvent and non-reactive with either or both the alpha-amino acid N-carboanhydride and resulting polyamide, it is preferred that polymerization of the N-carboanhydride be carried out in a solvent or swelling medium for both the N-carboanhydride and the synthetic, optically-active alpha-amino acid homopolyamide. Although in the examples only benzene is specifically illustrated, as a polymerization medium, it is to be understood that other liquid aromatic hydrocarbons or chlorinated hydrocarbons, non-reactive with the N-carboanhydrides and the alpha-amino acid homopolyamides, can be used, for instance, xylene, toluene, chloroform, chlorobenzene, tetrachloroethane, trichloroethylene, tetrachloroethylene, and carbon tetrachloride. Other polymerization media such as 2-methylfuran, tetrahydrofuran and thiophene may also be used.

For the preparation of the optically-active homopolyamides of this invention, it is preferred that the necessary purified N-carboanhydride be held at temperatures in the range 50–80° C. for at least 12 hours in a solution containing 0.5 to 20% by weight of the N-carboanhydride in one of the above-mentioned polymerization media. Although solutions of the N-carboanhydrides of both lower and higher concentrations may be used, for instance, concentrations as low as 0.1% or lower and as high as 30 to 50% or higher, to insure the preparation of the highest molecular weight homopolyamide in a reasonable period of time concentrations in the range of 0.5 to 5.0% are preferable.

Temperatures as low as 25–40° C. and as high as 100–200° C. or higher may be used in the polymerization cycle. However, to insure the preparation of the desired high molecular weight homopolyamide in a reasonable amount of time, temperatures above 50° C. are preferred. On the other hand, although polymerization is much more rapid at the higher temperatures, to insure the preparation of the highest molecular weight homopolyamide, it is preferred to use temperatures no higher than 100° C. and certainly no higher than 150° C. especially in solution polymerizations. Of course, in bulk thermal polymerizations temperatures as high as 200° C. may be conveniently used. However, in these instances it is generally preferred to carry out the polymerization at temperatures within 30 to 50° C. of the melting point of the carboanhydride involved. This will usually range from 75° C. to 150° C.

Although the polymerization can be carried out for as short a time as desired, for instance, 2 to 8 hours, for the preparation of the higher molecular weight homopolyamides, it is usually preferred to carry out the polymerization for at least 12 hours. In many instances, especially in the case of solution polymerizations, it is necessary to carry out the polymerization for periods in excess of 24 hours and sometimes for as long as 22 days or longer.

Although in the examples no specific illustrations are given of added polymerization initiators other than the relatively minute quantities of water present in the polymerization solvents, for instance less than 0.025% in reagent grade benzene, it is to be understood that minute quantities of added initiators can be added to the polymerization system. Suitable initiators such as the amino hydrogen containing amines and acids of selected range of ionization content are respectively disclosed in the applications of MacDonald Ser. No. 778,031, now Patent No. 2,592,447, and 778,032, now Patent No. 2,534,283, filed October 4, 1947. It is preferred to use the former type initiator since they serve most efficiently to both initiate and control the polymerization, and it is relatively more easy to obtain high molecular weight homopolyamides therewith.

The synthetic, optically-active homopolypeptides of this invention include both the homo-D and homo-L-alpha-amino acid polyamides. Surprisingly, for as yet unknown reasons, both types of synthetic, optically-active alpha-amino acid homopolyamides, i. e., those consisting solely of D- or L-alpha-amino acid units, are much superior in stiffness, hydrolytic stability, organic solvent resistance, and strength (especially in film- and fiber-form) to the corresponding optically-inactive alpha-amino acid polyamides, even than the corresponding optically-inactive alpha-amino acid homopolyamides, i. e., polymers containing solely units of DL-alpha-amino acids. Thus far, this phenomenon has only been observed with optically-active alpha-monoaminomonocarboxylic acids whose center of asymmetry resides in the alpha-carbon and thus in the polyamides is in the main polymer chain.

This invention is generic to optically-active alpha-monoaminomonocarboxylic acid homopolyamides, which, apart from the carbonamido linkage or group, are solely hydrocarbon in nature, preferably saturated, orientable, i. e., cold-drawable to the extent of at least 100%, of intrinsic viscosity, at 25° C. in a polar solvent, of at least 0.6, preferably greater than 0.8, and prepared, highly preferably by the N-carboanhydride route, from alpha-monoaminomonocarboxylic acids whose asymmetry centers in the alpha-carbon atom, including the D- or L-forms of alpha-amino-butyric acid, norvaline, valine, norleucine, isoleucine, alpha-amino-n-heptanoic acid, alpha-amino-alpha-methyl-n-butyric acid, N-methylalanine, alpha-amino-isoamylcetic acid, pseudoleucine, alpha-amino-alpha, gamma-dimethylvaleric acid. Of the homopolyamides of the present invention those are preferred which contain no more than seven carbons in the polymer unit, i. e., contain from three to seven carbons in the polymer unit, since it is with these polyamides that the superior toughness, organic solvent resistance, hydrolytic stability and strength are most clearly demonstrated.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A high molecular weight, synthetic, optically active homopolyamide, cold-drawn to the extent of at least 100%, of intrinsic viscosity, at 25° C. in a polar solvent, of at least 0.6, strong and tough in fiber form, whose repeating units are of three to seven carbons and are of a single antipodal species of an optically active alpha-monoaminomonocarboxylic acid whose optical activity is due to an asymmetric alpha-carbon atom and which is, apart from the carboxyl and amino groups, wholly hydrocarbon.

2. A high molecular weight, synthetic, optically active homopolyamide, cold-drawn to the extent of at least 100%, of intrinsic viscosity, at 25° C. in a polar solvent, of at least 0.6, strong and tough in fiber form, whose repeating units are of three to seven carbons and are of a single antipodal species of an optically active alpha-monoaminomonocarboxylic acid whose optical activity is due to an asymmetric alpha-carbon atom and which is, apart from the carboxyl and amino groups, wholly saturated hydrocarbon.

3. A fiber of a high molecular weight, synthetic, optically active homopolyamide, cold-drawn to the extent of at least 100%, of intrinsic viscosity, at 25° C. in a polar solvent, of at least 0.6, strong and tough in fiber form, whose repeating units are of three to seven carbons and are of a single antipodal species of an optically active alpha-monoaminomonocarboxylic acid whose optical activity is due to an asymmetric alpha-carbon atom and which is, apart for the carboxyl and amino groups, wholly hydrocarbon.

4. A fiber of a high molecular weight, synthetic, optically active homopolyamide, cold-drawn to the extent of at least 100%, of intrinsic viscosity, at 25° C. in a polar solvent, of at least 0.6, strong and tough in fiber form, whose repeating units are of three to seven carbons and are of a single antipodal species of an optically active alpha-monoaminomonocarboxylic acid whose optical activity is due to an asymmetric alpha-carbon atom and which is, apart from the carboxyl and amino groups, wholly saturated hydrocarbon.

5. A film of a high molecular weight, synthetic, optically active homopolyamide, cold-drawn to the extent of at least 100%, of intrinsic viscosity, at 25° C. in a polar solvent, of at least 0.6, strong and tough in film form, whose repeating units are of three to seven carbons and are of a single antipodal species of an optically active alpha-monoaminomonocarboxylic acid whose optical activity is due to an asymmetric alpha-carbon atom and which is, apart from the carboxyl and amino groups, wholly hydrocarbon.

References Cited in the file of this patent

UNITED STATES PATENTS

| Number | Name | Date |
|---|---|---|
| 2,071,251 | Carothers | Feb. 16, 1937 |
| 2,071,253 | Carothers | Feb. 16, 1937 |
| 2,516,145 | Prichard | Oct. 7, 1947 |
| 2,540,855 | Tullock | Feb. 6, 1951 |
| 2,657,972 | Woodward | Nov. 3, 1953 |

OTHER REFERENCES

Karrer: Organic Chemistry, Elsevier-Nordmann, 7th ed., 1938, page 91.

Go et al.: Bull. Chemical Soc. of Japan, vol. 14, No. 11, pages 510–516 (1939).

Office of Technical Services, PB 34, 279, Dec. 13, 1946 (3 pages).

Woodward et al.: Journ. Amer. Chem. Sec., vol. 69, June 1947, pages 1551-1552.

Astbury et al.: Nature, vol. 162, Oct. 16, 1948 pp. 596–600.

Alfrey: Mechanical Behavior of High Polymers, Interscience, 1948, pp. 500–505.